United States Patent
Delgado

(10) Patent No.: US 12,426,575 B2
(45) Date of Patent: Sep. 30, 2025

(54) OBEDIENCE TRAINING PET LEASH AND HARNESS SYSTEM

(71) Applicant: Christian Delgado, Pepperell, MA (US)

(72) Inventor: Christian Delgado, Pepperell, MA (US)

( * ) Notice: Subject to any disclaimer, the term of this patent is extended or adjusted under 35 U.S.C. 154(b) by 0 days.

(21) Appl. No.: 17/540,899

(22) Filed: Dec. 2, 2021

(65) Prior Publication Data

US 2023/0172166 A1    Jun. 8, 2023

(51) Int. Cl.
*A01K 27/00* (2006.01)

(52) U.S. Cl.
CPC .......... *A01K 27/004* (2013.01); *A01K 27/002* (2013.01); *A01K 27/009* (2013.01)

(58) Field of Classification Search
CPC .. A01K 27/003; A01K 27/002; A01K 27/009; A01K 15/023; A01K 27/004
See application file for complete search history.

(56) References Cited

U.S. PATENT DOCUMENTS

| | | | |
|---|---|---|---|
| 7,040,257 B2 | 5/2006 | Waxman et al. | |
| 8,418,659 B2 | 4/2013 | Harruna | |
| 8,955,465 B1 * | 2/2015 | VanDommelen | A01K 27/003 119/795 |
| 9,433,188 B2 | 9/2016 | Cuthbertson et al. | |
| 9,462,789 B2 | 10/2016 | Beck | |
| 10,602,722 B1 * | 3/2020 | Hetzer | A01K 27/009 |
| 2008/0223308 A1 * | 9/2008 | Stern | A01K 27/006 119/796 |
| 2010/0206246 A1 * | 8/2010 | Waldrep | A01K 27/004 119/796 |
| 2013/0247837 A1 | 9/2013 | So | |
| 2014/0283759 A1 * | 9/2014 | Bianchi | A01K 27/005 119/771 |
| 2016/0021506 A1 * | 1/2016 | Bonge, Jr. | H04W 4/027 717/173 |
| 2019/0141958 A1 * | 5/2019 | Price | A01K 27/004 119/796 |
| 2020/0260692 A1 * | 8/2020 | Tarantino | G01J 5/0265 |
| 2022/0117200 A1 * | 4/2022 | Fronapfel | A01K 27/009 |
| 2022/0322638 A1 * | 10/2022 | Galvez | H04W 4/022 |

\* cited by examiner

Primary Examiner — Joshua D Huson
Assistant Examiner — Alanna K Peterson
(74) Attorney, Agent, or Firm — Boudwin Intellectual Property Law, LLC; Daniel Boudwin

(57) ABSTRACT

An obedience training pet leash and harness system includes a housing. A primary leash is coiled within the housing. The primary leash extends from an opening in the housing with a primary lead that is disposed on a distal end of the primary leash, outside of the housing. A handle is formed on the housing, as well as a clutch trigger. The clutch trigger is configured to restrain the primary leash when the clutch trigger is engaged by the user. The handle has a control center. The control center is designed to control a number of obedience modules. The obedience modules are installed on a harness. The harness is designed to be worn by a pet and is designed to be secured to the primary lead.

1 Claim, 4 Drawing Sheets

OBEDIENCE TRAINING PET LEASH AND HARNESS SYSTEM

BACKGROUND OF THE INVENTION

The present invention relates to an obedience training pet leash. More specifically, the present invention provides a pet leash with enhanced obedience training functionality to assist a pet owner when utilizing a pet leash to restrain his or her pet.

Many people own pets for companionship, for assistance with a disability, or for other similar reasons. Owning a pet is a responsibility, as pets have needs for resources, such as water, food and shelter, in addition to the need for attention and stimulation. Among a pet's many needs, the need for exercise is one that presents a number of unique challenges to the pet's owner.

Generally, a pet owner will secure his or her pet to a leash in order to guide the pet while walking. The leash will also prevent a pet from running away or chasing other pets, people or moving objects. Some pets, however, require obedience training or other conditioning in order to safely and effectively be controlled with a leash. There are several methods of obedience training that may be utilized for training pets. For example, some training methods involve playing sounds, sending low current electrical shocks or locking the leash. Not every training method is effective for every pet.

Therefore, there is a defined need for an improved mechanism for assisting a user in obedience training his or her pet while taking the pet on a walk.

SUMMARY OF THE INVENTION

In view of the foregoing disadvantages inherent in the known types of pet obedience training systems now present in the prior art, the present invention provides an obedience training pet leash and harness system wherein the same can be utilized for providing convenience for the user when obedience training a pet.

The present system comprises a housing. A primary leash is disposed in the housing. The primary leash extends from an opening in the housing. A primary lead is disposed on a distal end of the primary leash, outside of the housing. A handle is disposed on the housing. A clutch trigger is also disposed on the housing. The clutch trigger is configured to restrain the primary leash when the clutch trigger is engaged by the user. A control center is disposed on the handle. The control center is configured to control one or more obedience modules. The one or more obedience modules are disposed on a harness. The harness is configured to be worn by a pet. The harness is configured to be secured to the primary lead and comprises one or more training modules. The one or more obedience training modules are controllable by the control center disposed on the handle.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
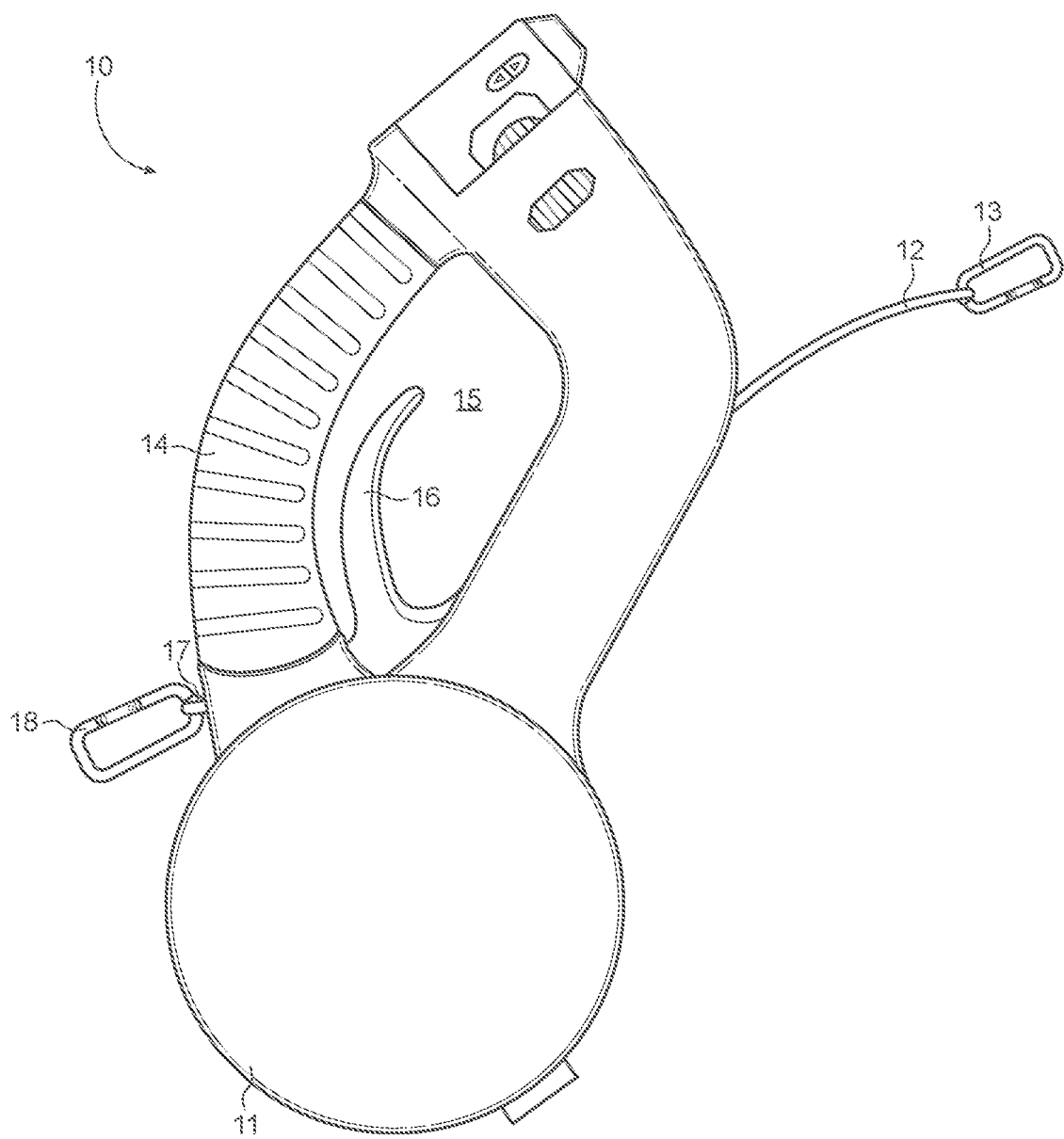
FIG. 1 shows a side view of an embodiment of the obedience training pet leash and harness system.

Reference is made herein to the attached drawings. Like reference numerals are used throughout the drawings to depict like or similar elements of the obedience training pet leash and harness system. The figures are intended for representative purposes only and should not be considered to be limiting in any respect.

Referring now to FIG. 1, there is shown a side view of an embodiment of the obedience training pet leash of the obedience training pet leash and harness system. The obedience training pet leash 10 comprises a housing 11. The housing 11 is configured to store a primary leash 12 therein. In the illustrated embodiment, the housing 11 is cylindrical, such that the primary leash 12 may be coiled within the housing 11. The primary leash 12 extends outward from an opening defined by the housing. The primary leash 12 comprises a primary lead 13 disposed on a distal end thereof. The primary lead 13 is configured to secure the primary leash 12 to the pet on which the obedience training pet leash 10 is implemented. The primary lead 13 is disposed outside of the housing 11. The primary lead 13 is dimensioned to prevent the primary lead 13 from entering the opening formed by the housing 11. In the illustrated embodiment, the primary lead 13 comprises a carabiner. The carabiner is configured to secure the primary leash 12 to a loop defined on the desired attachment point.

The housing 11 further comprises a handle 14. The handle 14 is configured to assist the user in grasping the obedience pet training leash 10. In the illustrated embodiment, the handle 14 extends upward from the housing 11, however, in alternate embodiments, the handle 14 can extend from any desired direction, relative to the housing 11. In the illustrated embodiment, the handle 14 is ergonomic, such as to provide enhanced comfort and usability to the user. Specifically, the handle 14 is shaped in an arcuate arrangement, defining a space 15 in which the user may insert his or her hand.

In the illustrated embodiment, the handle 14 defines the space 15 adjacent to the housing 11. In the illustrated embodiment, a clutch trigger 16 is disposed in the space 15 on the housing 11. The clutch trigger 16 is in operable connection with the primary leash 12. The clutch trigger 16 is configured to restrain the primary leash 12 when the clutch trigger 16 is engaged by the user. As such, in the event that the pet attached to the obedience training pet device 10 moves too far away from the housing 11 or attempts to run, the user may engage the clutch trigger 16 to prevent the movement.

Furthermore, in the illustrated embodiment, a secondary leash 17 is disposed on the housing 11. The secondary leash 17 is disposed within the housing 11 and extends outward through a secondary opening defined in the housing 11. The secondary leash, in the illustrated embodiment, comprises a secondary lead 18 disposed thereon. The secondary lead 18 is configured to secure the secondary leash 17 to a desired attachment point. In the illustrated embodiment, the secondary lead 18 comprises a carabiner. The carabiner is configured to secure the secondary leash 17 to a loop defined on the desired attachment point. The secondary leash 17 may be utilized to secure the housing 11 to the user, such as by securing the housing 11 to a waistband or harness worn by the user.

Figure 2:
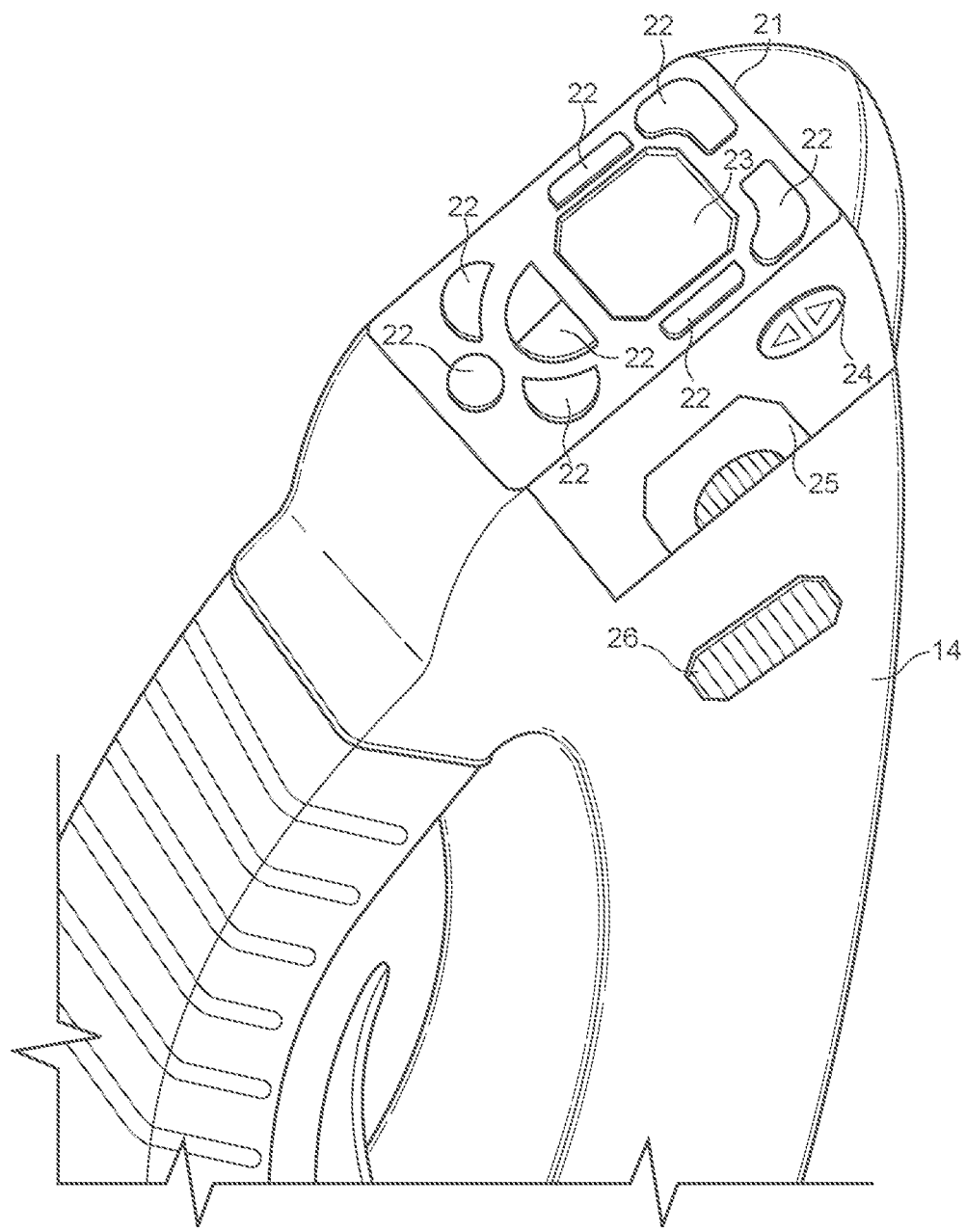
FIG. 2 shows a close-up view of a control center and top portion of the handle of an embodiment of the obedience training pet leash and harness system.

Referring now to FIG. 2, there is shown a close-up view of a control center and top portion of the handle of an embodiment of the obedience training pet leash and harness system. The obedience training pet leash 10 comprises a control center 21 disposed on the handle 14. The control center 21 is configured to enable the user to control the various functions of the obedience training pet leash and harness system. As such, in the illustrated embodiment, the control center 21 comprises a plurality of buttons 22 and a display screen 23.

The plurality of buttons 22 are in operable connection with one or more obedience training modules, the display screen 23 and any other implemented element. As such, when the user engages one or more of the plurality of buttons 22, one or more of the obedience training modules or display screen is actuated. For example, the plurality of buttons 22 may comprise a shock module actuator, a vibration module actuator, or an audio module actuator. When the shock module actuator is engaged, the shock module will be engaged. When the vibration module actuator is engaged, the vibration module will be engaged. When the audio module actuator is engaged, the audio module will be engaged. In the illustrated embodiment, the plurality of buttons 22 comprises a first set of buttons on a first side of the control center 21 and a second set of buttons on a second side of the control center 21. The first set of buttons correspond to a set of obedience training modules disposed on a first harness, attached to the primary leash.

Furthermore, in the illustrated embodiment, the control center 21 further comprises a control dial 24. The control dial 24 is in operable connection with a display 23. As such, the user may manipulate elements of a graphical user interface disposed on the display screen 23 utilizing the control dial 24. Furthermore, in the illustrated embodiment, the control center 21 comprises a detachment actuator 25. The detachment actuator 25 is configured to detach the harness (shown in FIG. 3) from the obedience training pet leash. Additionally, in the illustrated embodiment, a picatinny rail 26. In the illustrated embodiment the picatinny rail 26 is disposed on a side portion of the handle 14. The picatinny rail 26 is configured to secure one or more desired objects to the obedience training pet leash. For example, the picatinny rail 26 can be utilized to secure a flashlight to the handle 14.

Figure 3:
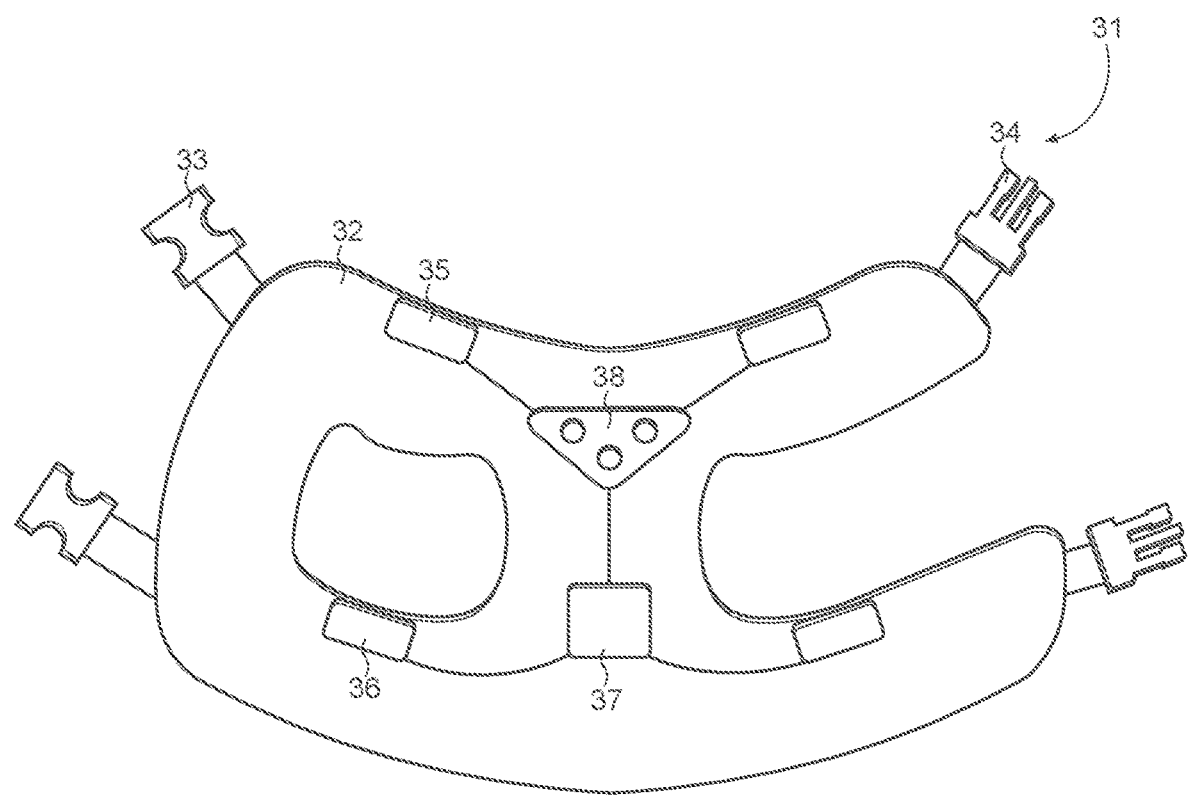
FIG. 3 shows a perspective view of a harness of an embodiment of the obedience training pet leash and harness system.

Referring now to FIG. 3, there is shown a perspective view of a harness of an embodiment of the obedience training pet leash and harness system. The harness 31 is configured to be worn by a pet (as demonstrated in FIG. 4). In the illustrated embodiment, the harness 31 comprises a harness body 32. The harness body 32 comprises a pair of openings configured to receive the paws of a pet therethrough. The harness body 32 is wrapped around the torso of the pet and secured by connecting a pair of male fasteners 34 to a pair of corresponding female fasteners 35. When wrapped, an opening for the head of the pet and an opening for the rear portion of the pet's torso are formed, thereby securing the harness 31 to the pet, as shown in FIG. 4.

The harness 31 comprises one or more obedience training modules 35, 36, 38. In the illustrated embodiment, the harness 31 comprises an audio module 35, a shock module 36, and a vibration module 38. The audio module 35 is configured to produce audio signals and noises from a speaker. The shock module 36 is configured to release an electrical shock to the pet. The electrical shock is of a sufficiently low voltage to not be harmful or damaging to the pet. The vibration module 38 is configured to vibrate the harness 31 when engaged. In the illustrated embodiment, the audio module 35, the shock module 36 and the vibration module 38 are in operable connection with a power source 37. The power source 37 is of any suitable orientation for storing electrical power. For example, the power source 37 may be a battery or a rechargeable battery.

Figure 4:
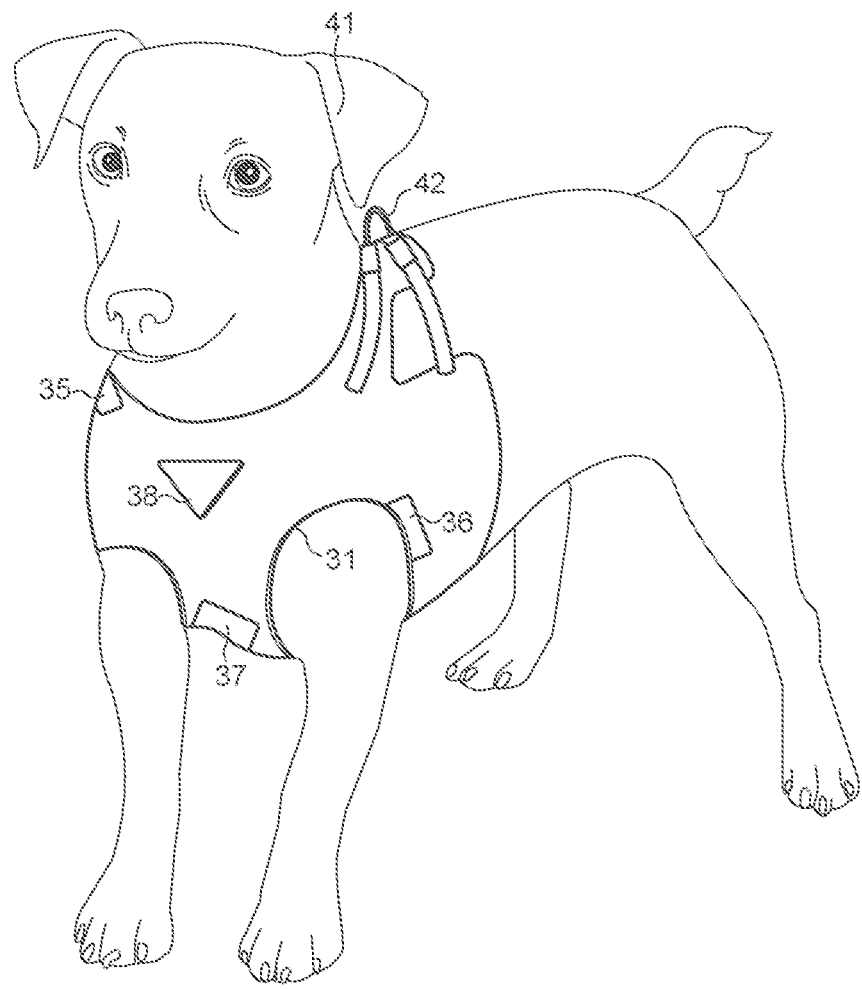
FIG. 4 shows a demonstrative view of a harness of an embodiment of the obedience training pet leash and harness system.

Referring now to FIG. 4, there is shown a demonstrative view of a harness of an embodiment of the obedience training pet leash and harness system. In use, the harness 31 is placed onto the pet 41. The harness 41 comprises a loop 42. The loop 42 is configured to secure the harness 41 to the primary leash of the obedience training pet leash (shown in FIG. 1). When placed, the plurality of obedience training modules 35, 36, 38 should be placed in positions to maximize their effectiveness. For example, in the illustrated embodiment, the audio module 35 is placed at an edge of the harness 31 closest to the ears of the pet 41, such that the sounds generated by the audio module 35 will be heard by the pet 41 in louder environments. Additionally, in the illustrated embodiment, the shock module 36 is placed in close proximity to the front legs of the pet 41. This may be desirable compared to other positions, as the pet 41 may feel the electrical shock more effectively at this position. Furthermore, in the illustrated embodiment, the vibration module 38 is centrally disposed on a chest portion of the harness 31. As such, the vibrations generated by the vibration module 38 may be felt in a relatively sensitive area of the pet 41.

In some embodiments, the obedience training pet leash and harness system comprises a perimeter mode. The perimeter mode enables the user to define a perimeter, around the obedience training pet leash, in which one or more of the obedience training modules 35, 36, 38 will be actuated when the harness 31 is detected to surpass the defined perimeter. Detection of the perimeter breach may be accomplished by any suitable means, such as by radio frequency (RF) or by a wireless network connection (WiFi). Alternatively, the perimeter functionality may be defined utilizing an electric fence. In other embodiments, the control center may provide different modes for the perimeter mode. For example, a dog walk mode, for situations where the pet is on the leash, may be defined where the audio module 35 is actuated at a distance of 1.5 yards, the vibration module 38 is actuated at a distance of 2.5 yards, and the shock module 36 is actuated at a distance of 3.5 yards. Additionally, a dog park mode, for situations where the pet is off the leash, may be defined where the audio module 35 is actuated at a distance of 50 yards, the vibration module 38 is actuated at a distance of 51 yards, and the shock module 36 is actuated at a distance of 52.5 yards.

In other embodiments, the obedience training pet leash and harness system is linked to a mobile phone application. The mobile phone application is configured to supplement the functionality while utilizing the functionality of the existing components. The mobile phone application may be utilized to control the functionality of the control center instead of the plurality of buttons. Furthermore, the mobile phone application can be utilized to measure and display activity levels and to record the times and durations of certain activities associated with the obedience training pet leash and harness system, such as dog walking time or outside time. Furthermore, the mobile phone application may be utilized for advertisements and services. In one embodiment, the user may be able to input the breed and weight of their pet in order to receive activity recommendations and health advice from participating veterinary professionals.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An obedience training pet leash and harness system, consisting of:
   a housing;
   a primary leash disposed in the housing;
   the primary leash extending from an opening in the housing;
   a primary lead disposed on a distal end of the primary leash, outside of the housing;
   a handle disposed on the housing;
   a clutch trigger disposed on a space in the housing, in operable connection with the leash;
   the clutch trigger configured to restrain the primary leash;
   a control center disposed on the handle;
   a harness configured to be worn by a pet;
   the harness comprising one or more obedience training modules;
   the one or more obedience training modules controllable by the control center;
   wherein the control center comprises a plurality of buttons and a display screen;
   further comprising a picatinny rail disposed on a side portion of the handle;
   further comprising a secondary leash with a secondary lead disposed on an opposing end of the housing from the primary lead;
   wherein the control center is in operable connection with and controllable via a mobile phone application; and
   further comprising a perimeter mode, wherein one or more of the obedience training modules is actuated when a distance between the obedience training pet leash and the harness exceeds a specified amount.

* * * * *